United States Patent [19]

Pulda

[11] 4,339,220

[45] Jul. 13, 1982

[54] STACKING OF MATERIALS

[75] Inventor: William F. Pulda, Piscataway, N.J.

[73] Assignee: Vanguard Machinery Corp., Edison, N.J.

[21] Appl. No.: 177,003

[22] Filed: Aug. 11, 1980

Related U.S. Application Data

[63] Continuation of Ser. No. 957,758, Nov. 6, 1978, abandoned, which is a continuation-in-part of Ser. No. 867,496, Jan. 6, 1978, abandoned, which is a continuation of Ser. No. 681,683, Apr. 29, 1976, Pat. No. 4,068,765.

[51] Int. Cl.³ .............................................. B65G 57/09
[52] U.S. Cl. ...................................... 414/84; 414/100
[58] Field of Search ....................... 414/36, 82, 84, 85, 414/98, 100; 271/199, 200, 201, 215

[56] References Cited

U.S. PATENT DOCUMENTS

| | | | |
|---|---|---|---|
| 2,699,264 | 1/1955 | Bruce et al. | 414/85 X |
| 3,017,041 | 1/1962 | Hawkes et al. | 414/117 X |
| 3,111,233 | 11/1963 | Raynor | 414/36 |
| 3,696,945 | 10/1972 | Bobolts | 414/84 X |
| 3,833,132 | 9/1974 | Alduk | 414/84 |
| 3,856,158 | 12/1974 | Currie | 414/100 X |
| 3,901,391 | 8/1975 | Carlson et al. | 414/84 X |
| 4,068,765 | 1/1978 | Pulda | 414/84 X |

FOREIGN PATENT DOCUMENTS 1390764  4/1975  United Kingdom ................. 414/85

*Primary Examiner*—Leslie J. Paperner
*Attorney, Agent, or Firm*—George E. Kersey

[57] ABSTRACT

A stacking assemblage fed from a conveyor which transports materials to a staging area. The materials are formed into a tier on a movable platen of the assemblage in accordance with a prescribed pattern. The platen can be raised or lowered to a desired level and then shifted to deposit each tier on an outboard conveyor until a desired multi-tier stack is formed.

27 Claims, 8 Drawing Figures

STACKING OF MATERIALS

This is a continuation of Ser. No. 957,758, filed Nov. 6, 1978, abandoned, which is a continuation-in-part of Ser. No. 867,496, filed Jan. 6, 1978, now abandoned, which is a continuation of Ser. No. 681,683 filed Apr. 29, 1976, now U.S. Pat. No. 4,068,765.

BACKGROUND OF THE INVENTION

The invention relates to the stacking of materials, and, more particularly, to the stacking of relatively large volumes of material.

There are many situations where it is desirable to deal with large volumes of material. One example is in the operation of high speed processing machinery. Unless the materials to be processed are available in sufficient quantities, the machinery will not be able to operate at full capacity.

Another example is the movement of materials over long distances. It is apparent that the subsequent handling of the materials will be expedited if they are pre-stacked.

It is common practice to form stacks of material on support structures such as pallets. The entire stack can then be moved by lifting the pallet.

Of course, if the materials are not arranged properly, the stack will not be able to provide the maximum quantity per unit volume. In addition, the stack may be unstable, particularly if it is large.

In order to provide stability and stack efficiency, it is common practice to form the stacks in tiers or layers, with each tier having a particular pattern. The patterns can then be alternated or varied in successive tiers in order to strengthen the average stack.

It is apparent that such a stack can be formed manually, but that is labor intensive. It is fatiguing to the stackers and relatively slow.

Numerous attempts have been made to reduce the fatigue factor and the number of persons needed for stacking. In various semi-automatic systems now in use, stacking takes place by an operator at the top of an inclined conveyor to which the items to be stacked are fed.

In one such arrangement, the stacker machine makes use of an open top elevator. Initially the elevator platform is fully elevated. An operator receives items to be stacked at the top of an inclined feed conveyor and places them at the top opening in a desired pattern on the elevated platform to form a base tier. The elevator platform is then lowered by one tier level and a new tier is formed on the prior tier. This procedure is repeated until the entire stack is formed and the platform is in its base position. The completed stack is then removed from the machine and sent on its way.

While an improvement over purely manual stacking, the elevator stacker has a number of disadvantages. The movable platform has to support the full weight of the overall stack and therefore must be mechanically rugged and complex. More importantly, the operator is positioned at the top of the elevator. Not only is there limited space for movement, the operator must remain in position throughout the stacking operation. Consequently he is not available for ground level activities that are inevitably required. Finally, the items to be stacked must be transported to the top of the elevator by a relatively large inclined conveyor. The result is that a lot of space is need for the stacking operation.

In a variant of the elevator stacker, the platform is made to carry each tier to the appropriate stack level and return to the top of the elevator to receive a subsequent tier. While this arrangement allows the platform to operate with a reduced load, the principal disadvantages of the ordinary elevator stacker remain, namely the need for an operator at the top of the elevator, so that he is unavailable for ground level duties, and the need for a relatively long, inclined conveyor to carry the materials to the stacking position, so that a significant amount of equipment space is required.

Accordingly, it is an object of the invention to expedite the stacking of materials. A related object is to expedite the stacking of large volumes of material.

Another object of the invention is to enhance the effectiveness of stacking with mechanical equipment. A related objective is to enhance the effectiveness of stacking with semi-automatic equipment.

A further object of the invention is to achieve automated stacking using a limited amount of equipment space. A related object is to eliminate the need for relatively long, inclined power conveyors in semi-automatic stacking.

Yet another object of the invention is to enhance operator effectiveness in semi-automatic stacking. A related object is to make the operator in semi-automatic stacking available for other ground level duties, as well as the control of stacking. Another related object is to eliminate the need for stationing an operator at relatively high levels (as much as eight feet) above ground level in semi-automatic stacking.

SUMMARY OF THE INVENTION

In accomplishing the foregoing and related objects, the invention makes use of a translatable and laterally displaceable platen. Materials at a receiving position are arranged on the platen in a single tier or layer at a time in a prescribed pattern. The platen is then moved to overlie a loading position and the tier deposited. Subsequent tiers are formed and deposited in the same way to produce a multi-tier stack at the loading position.

In accordance with one aspect of the invention, each tier can be formed on the platen by or under the control of a ground level operator. As a result the operator is free to pursue other ground level duties. In addition there is no need to use a relatively long, inclined conveyor to carry materials to the receiving position. The result is a considerable saving in the space that would otherwise be used by the inclined conveyor.

In accordance with another aspect of the invention, the receiving position and the loading position are at the same operational level. This permits a ground level operator to attend to both loading and stacking operation.

In accordance with a further aspect of the invention, the platen is elevatable. This permits the stack to be formed by building successive tiers on prior tiers at the loading position.

In accordance with a still further aspect of the invention, the platen can be lowered from its initial position. This permits an extension in the range of the stacking equipment.

In accordance with yet another aspect of the invention, a guide member, which can take the form of a stripper, can be employed to facilitate the deposits of each tier in the proper position at the loading position.

In a particular embodiment of the invention the platen is supported by a carriage that is vertically moveable on a columnar support. The carriage desirably includes circuitry to permit the automatic positioning of the carriage with respect to the stack that is formed at the loading position. By virtue of this automatic operation the carriage is self-positionable with respect to a stack being formed so that the subsequent operation of the carriage supported platen accurately positions the next tier of the stack upon the tiers previously formed.

In accordance with this embodiment the positioning circuitry includes a sensing system that desirably includes four photoelectric cells, two upper cells and two lower cells. An upper and a lower cell are advantageously positioned at the outer edge of the carriage while a corresponding pair of upper and lower cells are also positioned near the center of the carriage. The upper cells then control the automatic upward motion of the carriage; while the two lower cells control the automatic downward motion.

In accordance with a further aspect of this embodiment, the stripper is formed by two members which are moveable relative to one another and are jointly moveable in a vertical direction. The vertical and the lateral motions of the stripper members is illustratively controlled pneumatically. For that purpose a support structure, desirably in the form of support rods, is mounted on the carriage for the slidable support of the stripper assembly. The vertical displacement of the stripper assembly is illustratively achieved using a cylinder that has a free end connected to the carriage and another end connected to extension support, for the stripper assembly.

The lateral motion of one of the stripper components is illustratively provided by a second cylinder which acts upon a pivoted link so that when the rod of the cylinder is extended, a moveable baffle of the stripper is pivoted to provide the desired displacement. This accurately positions the last tier deposited on the stack, so that a subsequent retraction of the cylinder withdraws the baffle and there is no interference with subsequent stripper operations. In addition the baffle is desirably in two parts, one part above the platen and the other part below the platen so that when the platen is withdrawn the lower part of the baffle can assure proper alignment of the last deposited tier. To assure the desired alignment after the last deposited tier has settled into position, the lower baffle is advantageously operated with a paddling motion that can provide a final alignment correction.

In accordance with yet another aspect of this embodiment the vertical motion of the carriage, upon which the moveable platen is mounted, is controlled by a rotating, motor-driven screw.

DESCRIPTION OF THE DRAWINGS

Other aspects of the invention will become apparent after considering several illustrative embodiments, taken in conjunction with the drawings, in which.

DETAILED DESCRIPTION

Figure 1:
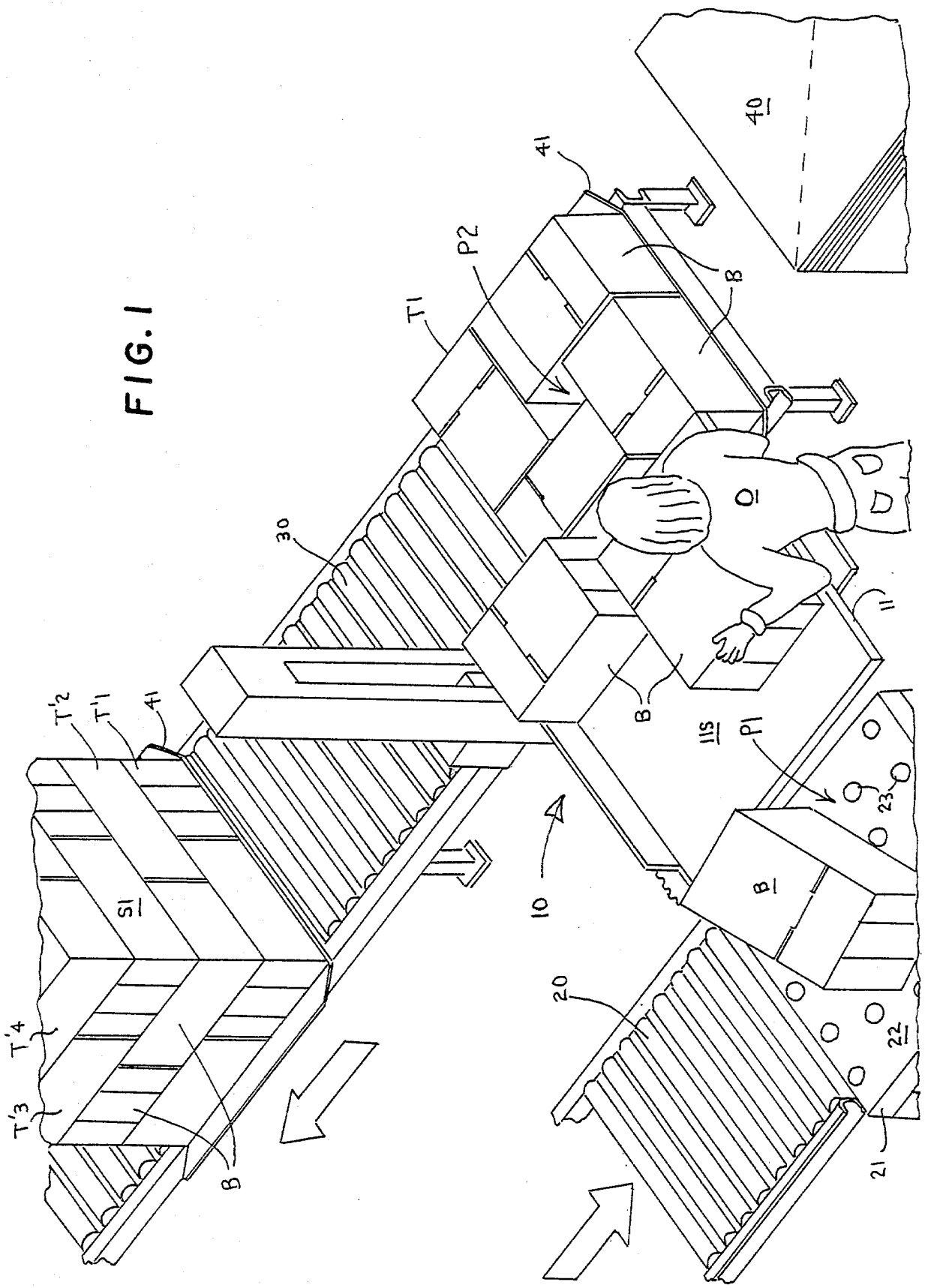
FIG. 1 is a partial perspective view of a system being used to form stacks in accordance with the invention.

Turning to the drawings, a stacking assemblage 10 in accordance with the invention is positioned between a receiving or staging position P1 and an outbound or loading position P2.

Items to be stacked, such as individual bundles B, reach the receiving position P1 over an infeed conveyor 20, which terminates in staging platform 21. To facilitate the movement of the bundles B on the platform 21, its surface 22 has a set of raised spheroids 23. In some cases, it is advantageous to further facilitate the movement of the bundles across the surface 22 by substituting ball bearings for the spheroids 23.

Once a bundle arrives at the staging area, it is moved by an operator O to a platen 11 of the stacking assemblage 10, where it forms a part of a prescribed pattern of bundles in a single tier or layer. The surface 11s of the platen 11 may be an ordinary plane, but it may also be similar to the surface 22 of the staging platform 21 to facilitate movement of the bundles, or it may be formed by rotatable cylinders of the kind commonly employed in conveyors.

After each tier is completed by the operator O on the platen 11, the stacking assemblage 10 is operated to deposit the tier at the loading position P2 on an outbound conveyor 30.

As can be seen in FIG. 1, a prior tier T1 is already located at the loading position P2; and a prior stack S1 that has been formed by the stacking assemblage 10 is farther down the outbound conveyor 30. The stack S1 is made up of various tiers, of which tiers T'1 and T'2, and parts of tiers T'3 and T'4 are visible. The stack S1 and the tier T1 are formed on a support sheet 41 which is taken from a stack 40. In some cases pallets are substituted for the support sheets 41. In other cases no support sheet is needed.

It will be noted that the tiers T'1 through T'4 of the stack S1 have alternative configurations in order to increase the stability of the overall stack. Each bundle B is illustratively rectangular, being formed by a substack of collapsed boxes which are to be imprinted and filled with merchandise. In the stack S1 the bundles are lapped for increased stability by having each short side adjoining a long side in an adjoining tier.

In addition, an automatic device may be substituted for the staging platform 21 in order to arrange the incoming bundles in a prescribed pattern on the platen 11.

Figure 2:
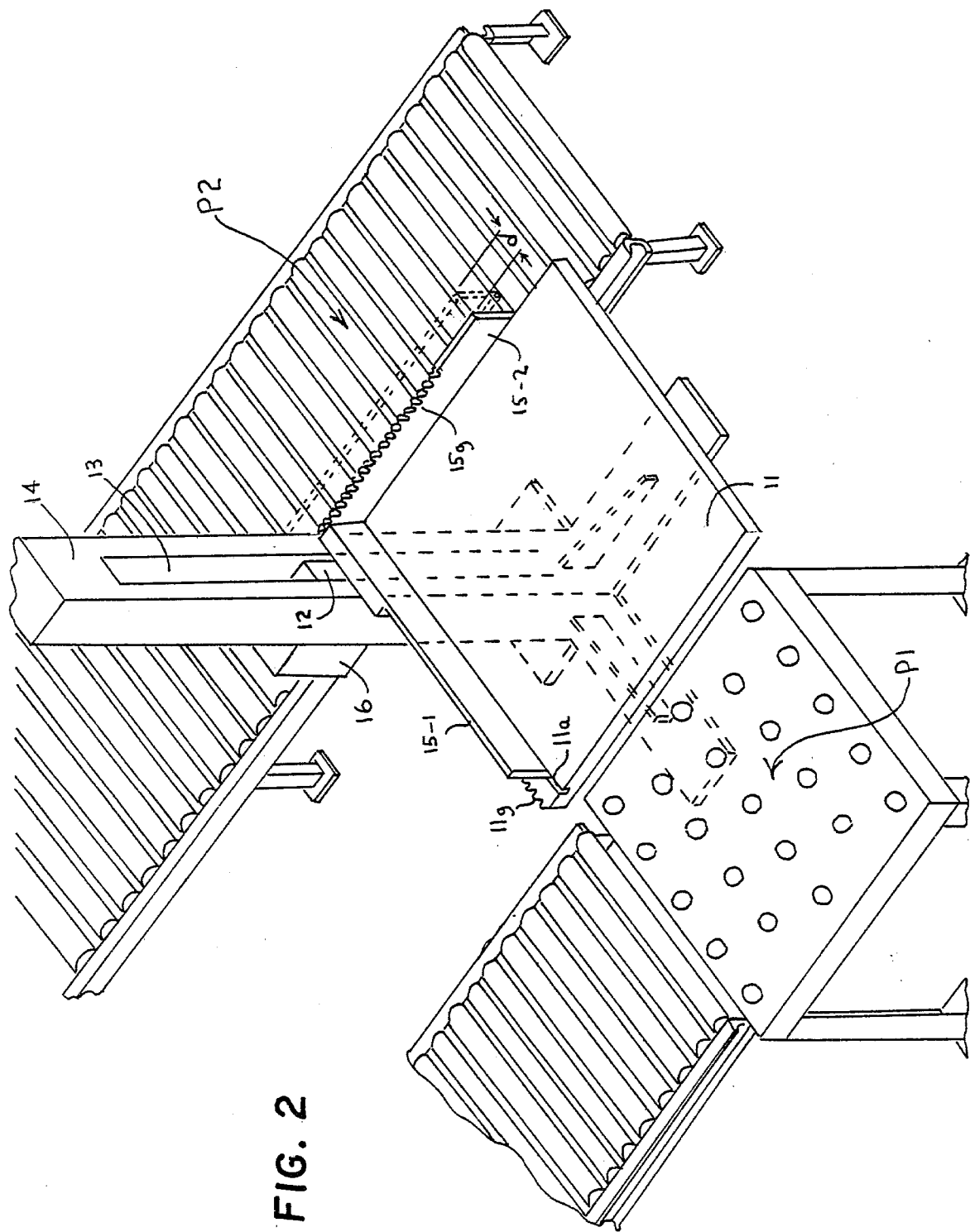
FIG. 2 is a partial perspective view showing details of the system of FIG. 1.

Details of the stacking assemblage 10 are shown in FIG. 2. The platen 11 is vertically and horizontally movable by being mounted with respect to a platen support 12 in a channel 13 of stacker support 14. Gear head motors (not shown) of conventional design may be used with drive cables to move the support 12, and in turn the platen 11, upwardly or downwardly on command.

Horizontal movement of the platen 11 is provided by appropriate gearing (not shown) in the support 12 which acts on gear teeth 11g to move the platen until it overlies the loading position P2.

To further facilitate the operation of the stacking assemblage 10, guide members 15-1 and 15-2 are included. The first guide member 15-1 is attached to the platen support 12, so that movement of the platen 11 is relative to it, in a guide groove 11a.

The second guide member 15-2 is retractable with respect to a mount 16 that moves with the platen support 12. The mount 16 not only includes gearing (not shown) that meshes with the guide teeth 15g; in addition, the mount 16 desirably includes a yoke and plunger arrangement, for example (not shown) to displace the second guide 15-2 in the direction of the lateral movement of the platen 11 by a prescribed amount d.

Figure 3:
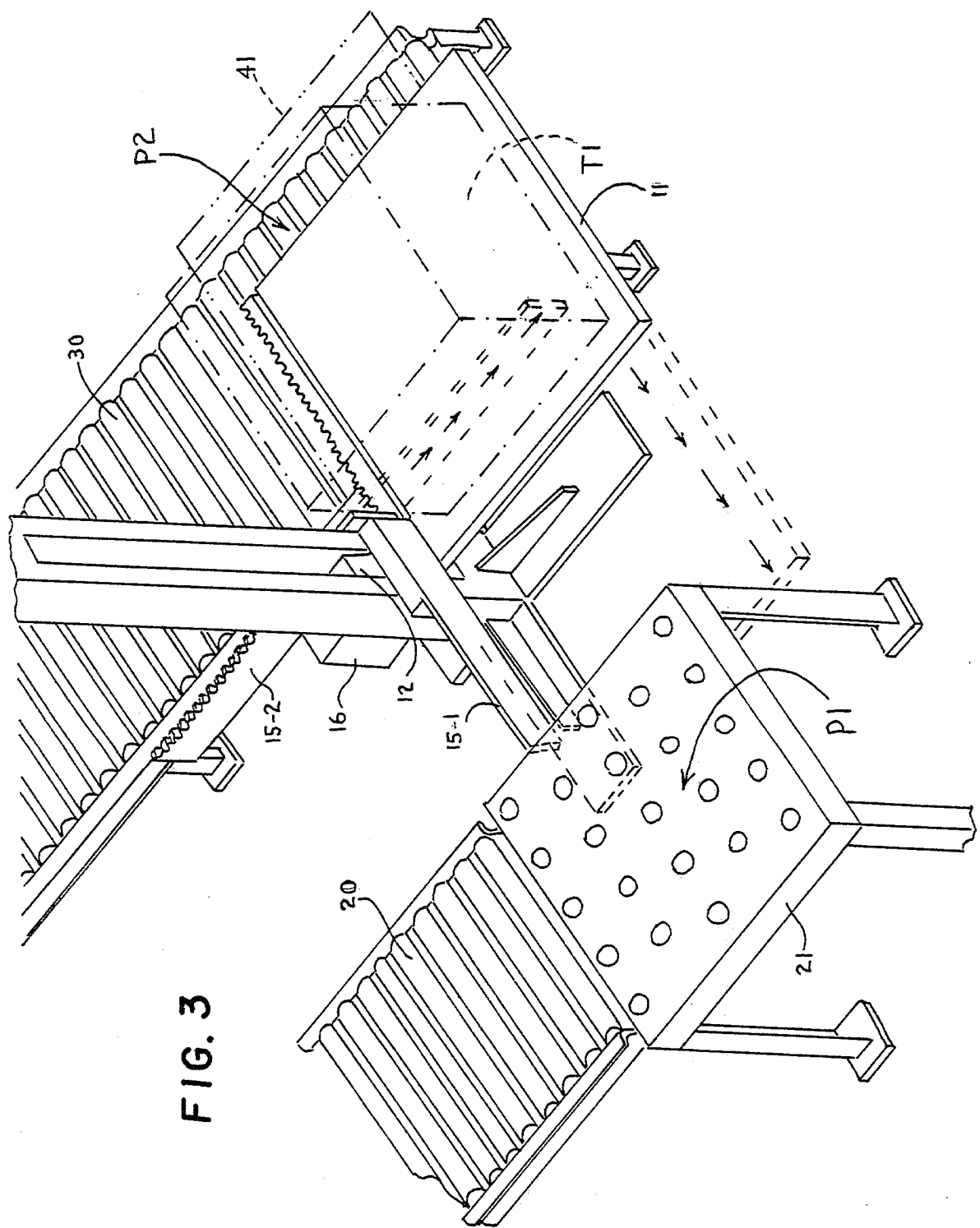
FIG. 3 is a partial perspective view showing a platen of a stacking assemblage in accordance with the invention being moved to overlie a loading position.

An illustrative displacement of the platen 11 is pictured in FIG. 3. As shown, the platen 11 had previously been lowered below the level of the staging platform 21 after the formulation of the tier T1 shown in phantom by downward movement of the platen support 12. This is because the outbound conveyor 30 is located below the level of the inbound conveyor 20. Since multi-tier stacks are to be formed on the outbound conveyor 30, it is advantageous for the conveyor to be below the level at which operator force will be applied to move the resultant stacks along the conveyor. In addition, even if the outbound conveyor 30 is at the level of the inbound conveyor 20, it is advantageous for the platen 11 to go below that level in order to extend the stacking capability.

Thus, if the platen can be lowered by one or more tier levels, an operator can form two or more tiers on the platen while working at customary ground level. The multiple tier is then deposited at the loading position in the usual way.

Before the platen in FIG. 3 begins its movement towards the loading position, the second guide 15-2, which acts as a stripper, is retracted. This is to prevent interference with the tier T1. Once the platen is fully displaced, the stripper is returned to its original position. When the platen 11 is moved towards the staging member 21, the tier T1 engages the outward side of the stripper and is prevented from further movement, so that it drops at the loading position on the support sheet 41.

As noted earlier, the stripper 15-2 is desirably displaceable in the direction of outward movement of the platen 11. This displacement prevents the tiers of the stack formed at the loading position from interfering with the stacking assemblage 10 by providing for example, a clearance on the order of several inches depending on the extent of the lateral displacement of the stripper.

Figure 4:
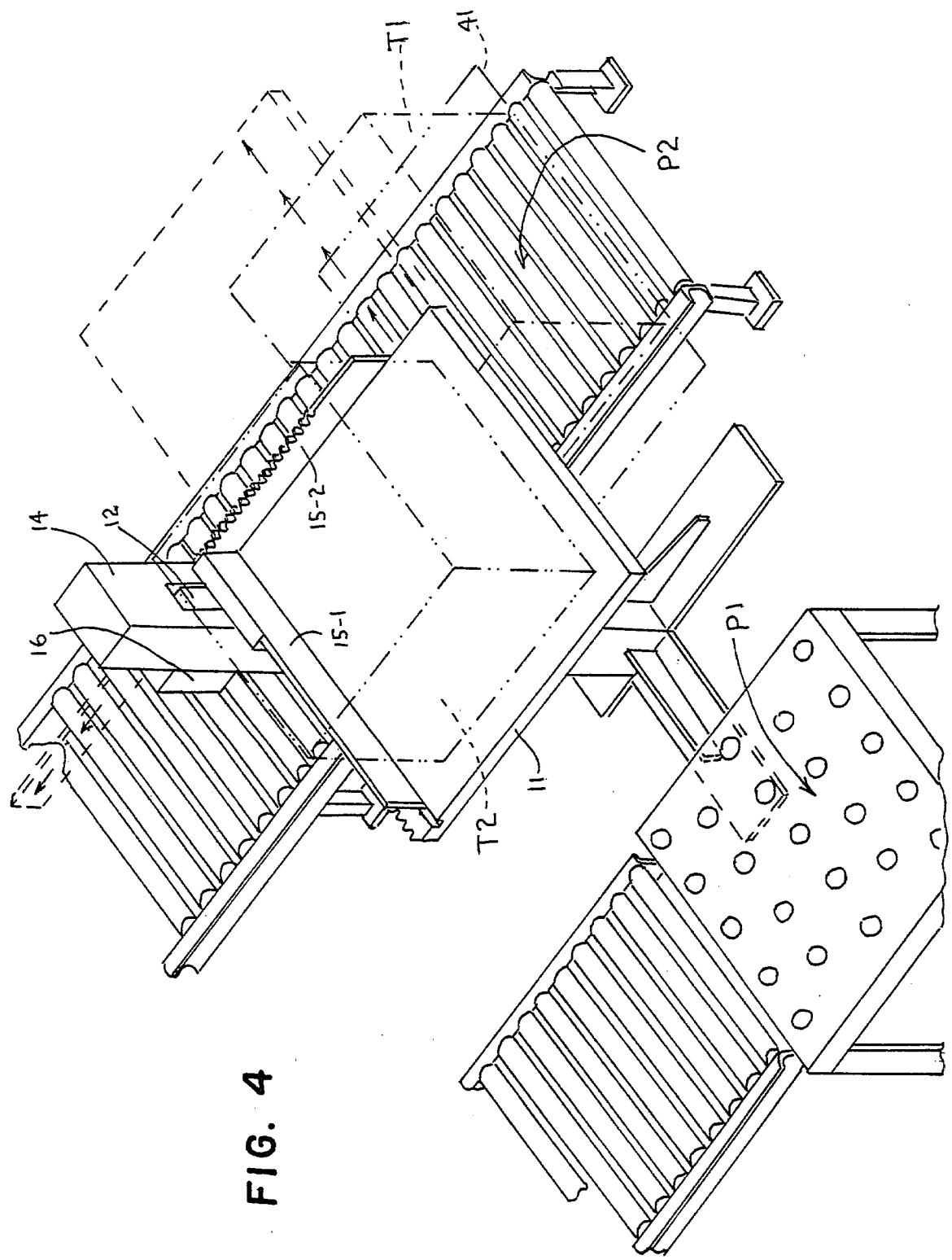
FIG. 4 is a partial perspective view showing the platen of FIG. 3 in an elevated position prior to being moved to overlie the loading position.

In FIG. 4, the platen 11 is shown in an elevated position preparatory to the deposit on a second tier T2 on the prior tier T1 at the loading position P2. The operation of the stacking assemblage is otherwise the same as that illustrated in FIG. 3.

Figure 5:
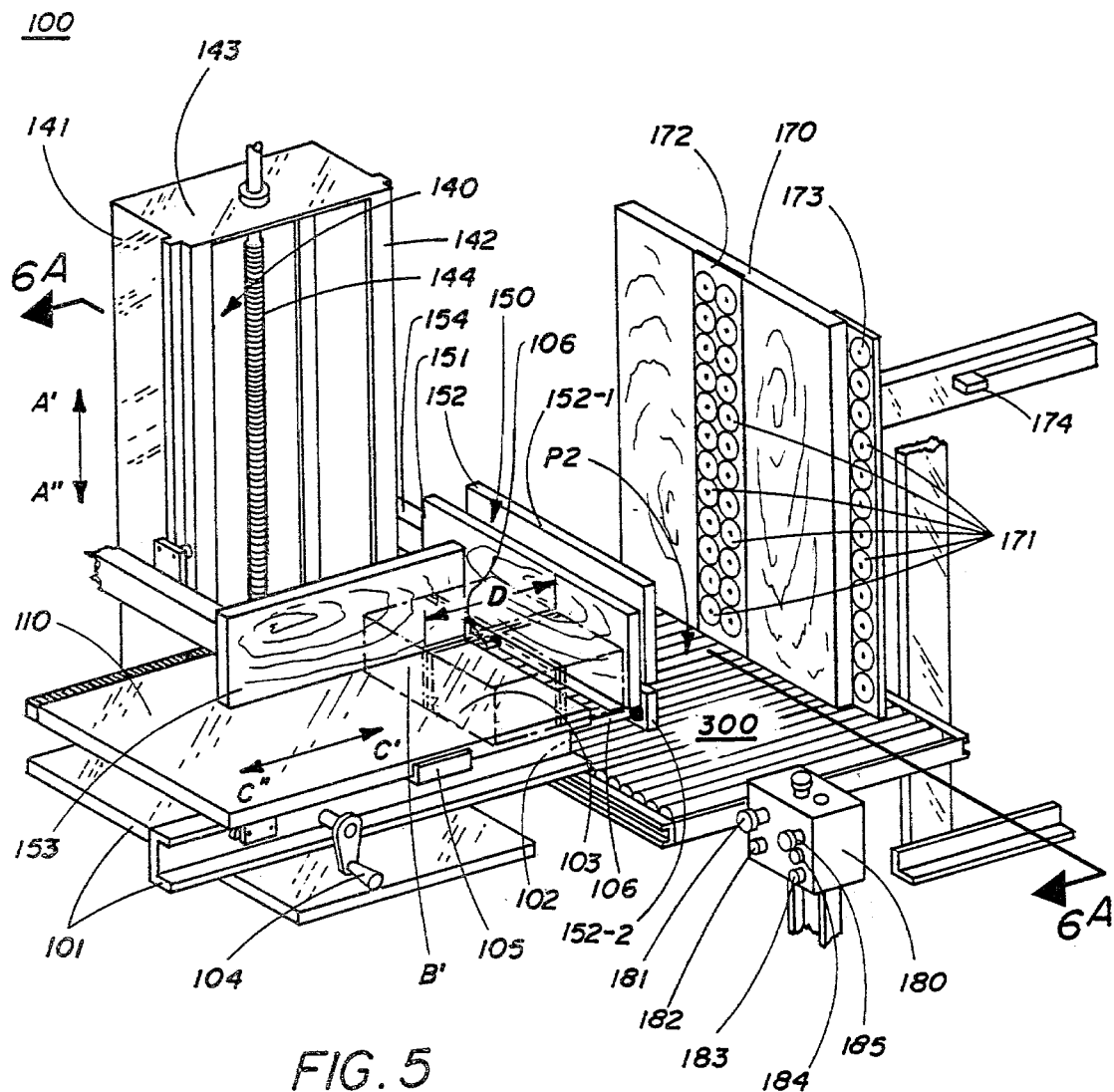
FIG. 5 is a perspective view of an alternative stacking assemblage in accordance with the invention.

An alternative stacking assemblage 100 is shown in FIG. 5 adjacent a conveyor 300 at a loading position P2. In the assemblage 100 a platen 110 is slidably supported on a carriage 101. The latter is cantilever mounted and moveable in an upward vertical direction indicated by the arrow A' and in a downward verticle direction indicated by the arrow A" along guide rails (not shown) of a stacking support 140.

The particular support 140 includes side members 141 and 142 and an end member 143. A screw 144 is rotatably mounted in the end member 143, as well as in an opposite base member (not visible in FIG. 5). The screw 144 is driven in a clockwise or counterclockwise direction in standard fashion, for example, by a motor (not shown) mounted on one of the side members 141 or 142 and coupled to a drive gear for the screw 144 by a timing chain or belt. The screw 144 is also threaded into an extension (not visible in FIG. 5) of the carriage 101, so that as the screw rotates in either a clockwise or a counterclockwise direction, the carriage is moved up or down, as indicated by the arrows A' and A".

The carriage 101 also mounts a stripper 150, formed by an inner board 151 and outer boards 152-1 and 152-2. As explained below, the outer boards are laterally moveable with respect to the inner board 151 at prescribed intervals of the stacking cycle. Both the inner board 151 and the outer boards 152-1 and 152-2 are illustratively mounted on the carraige 101 in a manner demonstrated below. In addition to the stripper 150, the assemblage 100 of FIG. 5 includes a positionable pattern backboard 152 that is used in forming the desired tier B' shown in phantom on the platform 110.

Figure 6A:
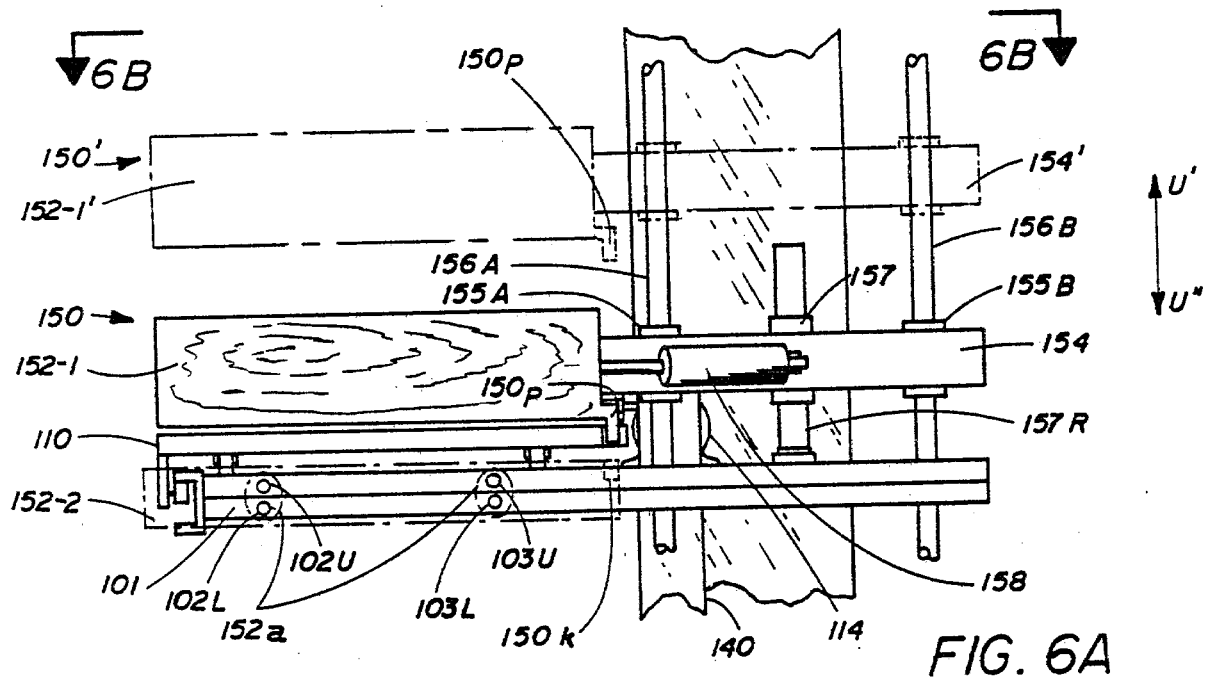
FIG. 6A is a partial elevational view showing mounting and operational details of the stripper and platen of the stacking assemblage of FIG. 5.

The particular embodiment of FIG. 5 also makes use of electric eye automatic control. The eyes 102 and 103 are illustratively mounted in the carriage 101 as shown in FIG. 6A. The electric eye control makes use of a backstop 170 with a series of reflectors 171 in two vertical columns 172 and 173. One of the columns 172 is centrally located on the backstop and has a double set of reflectors 171. The remaining column 173 is at the edge of the backstop and has a single set of reflectors 171. The reason for using a double set of reflectors in the middle column 172 is explained below. The backstop 170 is adjustable with respect to the surface of the conveyor at the pattern forming position as well as with respect to the assemblage 100.

Control over the stacking assemblage 100 is effected from a control box 180. Initially, however, a crank handle 104 is used to adjust the pattern backboard 153 to the desired position with respect to the inner board 151 of the stripper 150. In practice the edge of the pattern board 153 can extend over the table of the platen 110 for a prescribed distance.

A platen pattern depth switch 112 is desirably next adjusted with respect to the back of the anticipated tier B'. The depth D of the tier B' is then measured and the position of the backstop 170 correctly located using the scale 174, together with a conventional rack and pinion adjusting device (not shown).

In the control box 180, a control stick 181 is used for manual override of certain functions. Raising the stick 181 causes the carriage 101 to go up in the direction A'; while lowering the stick 181 causes the carriage 101 to go down in the direction of arrow A". If the stick 181 is moved horizontally in one direction the stripper expands as illustrated in FIG. 6B; while moving the stick 181 horizontally in the other direction causes the carriage 101 to return to its home position, which is at a predetermined operator level.

The control box 180 also includes a selector switch 182 with one position for automatic or normal operation and another position for raising the stripper as shown in FIG. 6A. Also included in the control box 180 is a speed selector 183 for regulating the speed of platen 110 on its outstroke motion indicated by arrow C". The return stroke, indicated by the arrow C", is automatically fixed at a maximum for all conditions. This allows control over the outstroke for a wide variety of patterns. Further members of control box 180 is a start button 184 that is used to apply power to the machine and a stop button 185. A further button 186 is used to cycle each layer of bundles.

Figure 6B:
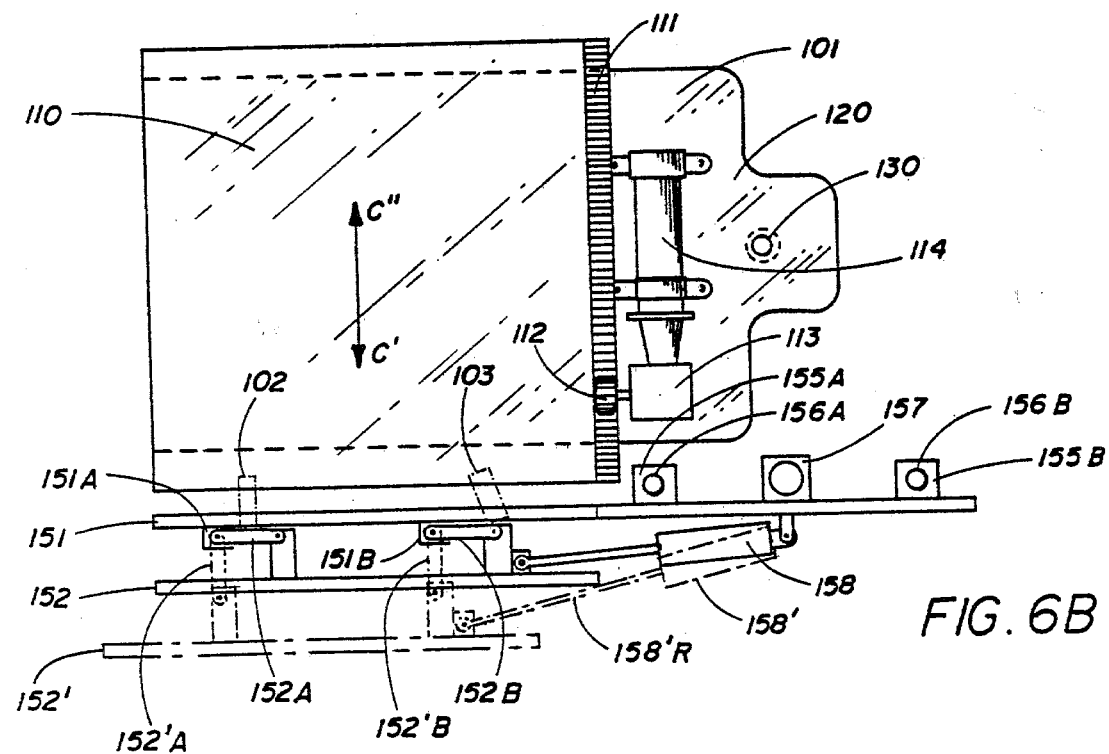
FIG. 6B is a partial plan view showing mounting and operational details for the stripper and platen of FIG. 6A.
Figure 6C:
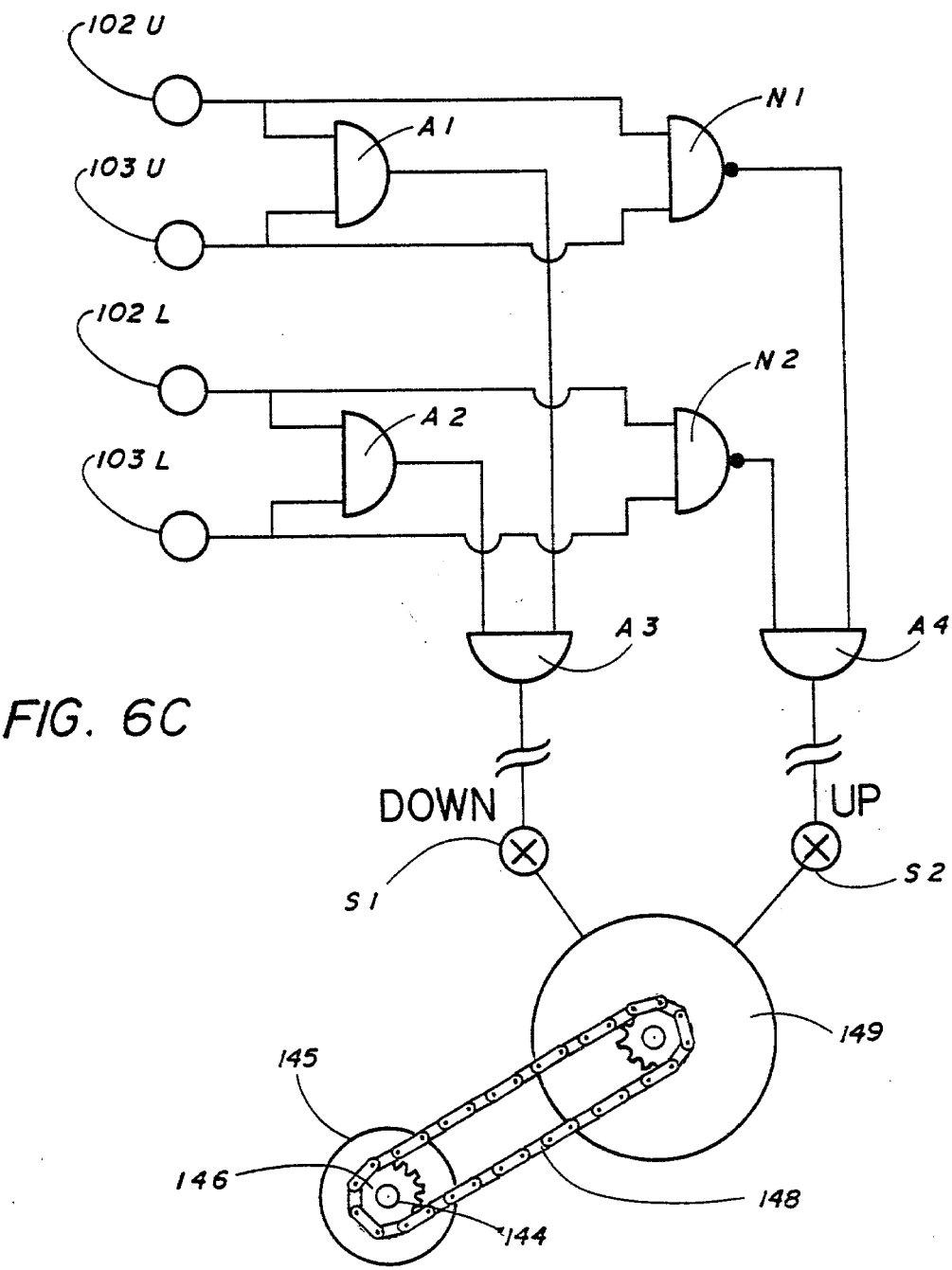
FIG. 6C is a schematic view of the electric eye control circuitry for the stacking assemblage of FIG. 5.

Details of the stripper and platen operation are illustrated in FIGS. 6A through 6C. In the schematic showing of FIG. 6A the stripper 150 is shown mounted with an extension 154 that is in turn secured by bearings 155A and 155B that embrace vertical slide rods 156A and 156B. The extension 154 permits the entire stripper 150 to move up and down on the rods 156A and 156B in the direction indicated by the arrows U' and U" by control cylinder 157. One end of the control cylinder 157 is attached by a moveable rod 157r to the carriage 101 so that when the cylinder 157 is operated in conventional fashion (by fluid actuation of an internal piston) the entire stripper is able to move up or down in the direction U' or U". This upward actuation of the stripper 150 causes it to move transversely with respect to the platen 110 to the phantom position 150'.

It will be understood that each of the photocell pairs 102 and 103 includes a light source and an eye that responds to light from the source reflected from one of the reflectors 171 of FIG. 5.

In FIG. 6B which is a top view of the schematic representation of FIG. 6A, it is seen that the platen 110 is movable by a rack 111 and a pinion drive 112. The latter is operated from the gear box 113 of a motor 114 mounted on the carriage 101. In addition, FIG. 6B shows the outer and inner boards 152 and 151 of the stripper 150 and the way in which the outer boards 152-1 and 152-2 are pivotable with respect to the inner board 151 by virtue of operation of a second cylinder 158. When the carriage 101 is at a proper position determined by the photocells 102 and 103, the next operation is for the stripper 150 to be raised transversely with respect to the platen 110 by the cylinder 157 shown in FIG. 6A, following which the platen moves by operation of the motor 114 in the direction indicated by the arrow C' in FIG. 6B to overlie the stacking position.

The next step in the stacking cycle is the lowering of the stripper 150 by reverse operation of the stripper elevation cylinder 157. The upper board 152-1 then engages the lower board 152-2 (shown in outline) by the entry of a pin 150p into the socket 150k of the lower board 152-2. The two boards 152-1 and 152-2 are then pivoted outwardly to provide the desired stack alignment through operation of the cylinder 158 to position 152'. It is to be noted that for the purpose the lower board 152-2 is pivotally connected to the carriage by arms 106 as shown in FIG. 5. In addition the lower board contains aperture 152a for the photocells 102 and 103.

In the following step, the platen 110 is withdrawn by reverse operation of the motor 114 in the direction of the arrow C". The provision of proper clearance between the tier deposited on the stack and the edge of the stack is provided by the operation of the positioning cylinder 158 of FIG. 6B to the phantom position 158' which moves the outer board to the phantom position 152', to provide the desired clearance, and then returns the board to its regular position 152. For that purpose the outer board is attached to mounts 151a and 151b by pivotable links 152a and 152b. The rod 158r is connected to the link 152b and pushes it to the phantom position 152b' when it is operated. Also seen in FIG. 6B is an extension 120 for the carriage 101 with a threaded aperture 130 for the screw 144 of FIG. 5.

The automatic positioning of the carriage 101 at the desired stacking level makes use of the photocell pairs 102 and 103 with circuitry of the kind illustrated in FIG. 6C.

The upper photocells 102U and 103U are connected to the input terminals of an AND gate A1 and a NAND gate N1. The outputs of the AND gate A1 and A2 are inputs to a third AND gate A3; while the outputs of the NAND gate N1 and N2 are inputs to a fourth AND gate A4.

The downward motion of the carriage 101 is controlled by the output of the AND gate A3 through a switch S1; while the upward motion of the carriage is controlled by the output of the AND gate A4 through a switch S2.

Thus when the motor 149 (which can be mounted on the support 140 of FIG. 5) is energized through switch S1, it drives a gear 146 which is connected to the shaft of the screw 144 of FIG. 5 that is supported in bearing 145.

When all photocell eyes see light transmitted to and returned from various ones of the reflectors 171 of FIG. 5, the AND gates A1, a1 and A3 are active, while the AND gate A4 is inactive, so that a signal is available for moving the carriage downward if the switch S1 is closed. This motion proceeds until one of the eyes does not see light. This will be one of the lower eyes since it will be the first to encounter a darkness condition, caused, for example, by encountering the upper edge of the stack being formed at the stacking position P2, or by encountering a lower stop. In the latter case, the carriage can be made to seek a "home" position at a prescribed operator level by switching to upward motion which is terminated when, for example, a magnetic stop is sensed on the stacking support.

If either or both of the lower eyes 102L or 103L do not see light, and both upper eyes 102U and 103U see reflected light, the carriage will remain in the position for which this condition occurs since at least one of the AND gates A1 or A2 will be inactive, causing the output AND gate A3 to be inactive as well.

Conversely, if all of the eyes fail to see light, the AND gate A1 and A2 will be inactive, but the NAND gates N1 and N2 will be active. Therefore, the carriage 101 will move upward if the switch S3 is closed. This motion proceeds until two eyes at the same level see reflected light. This will be the upper eyes 102U and 103U since they will be the first to encounter the reflected light condition, caused, for example, by passing above the upper edge of the stack being formed at the stacking position P2, or by encountering an upper stop. In the latter case the carriage again can be made to seek a "home" position.

Because of the use of NAND gates N1 and N2 to control the upward motion, if only one upper eye 102U or 103U sees light, the upward motion will continue until both eyes see reflected light. This prevents operation of the platen until it is in position to clear the prior deposited tier, whether or not it is skewed or otherwise is out of alignment.

The platen 110 is advantageously controlled by a DC motor to provide accurate speed control. The carriage elevation motor (e.g. motor 149 of FIG. 6C) is desirably a "Demag" AC motor with conical brakes. When energized it shifts sideways, and when deenergized it slides into its home braking position. A similar result could be achieved using a clutch and brake system. The stripper 150 is desirably operated by two fluid controlled cylinders 157 and 158, for which an illustrative fluid is air. However, other fluids can be used, such as oil, and a DC motor could be substituted with an appropriate drive. Although the transverse motion of the stripper relative to the platen is elevation, the cylinder could also be used to provide lateral platen motion.

It is to be noted that eyes 103U and 103L are desirably mounted so that they receive diagonally reflected rays of light from the twin column 172 of reflectors 171. This assures proper operation even when the tier formed on the platen has a gap between items that could pass light without blockage and thus cause the platen to seek an improper level. Because of the diagonal mounting of the eyes 103U and 103L, twin reflectors are needed at each level in the column 172 in order to assure proper operation regardless of the adjustment made in the backboard 170. Thus the outer reflectors of the column 172 are active when the board is adjusted away from the carriage, and the inner reflectors are active when the board is adjusted towards the carriage.

While various aspects of the invention have been set forth by the drawings and the specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A stacking assemblage comprising
means for supporting materials received at a first position and arranged in a tier in accordance with a prescribed pattern, and containing a possible misalignment;
means including photoelectric sensors for automatically positioning the supporting means at a desired stacking level regardless of any misalignment in said tier;
said sensors comprising upper and lower photo cells pairs which respond to light and cause said supporting means to move until both of the eyes of either the upper pair or lower pair receive the light; and
means responsive to the positioning means for automatically shifting the supporting means to overlie a second position and depositing said tier thereat as a constituent for a multi-tier stack.

2. A stacking assemblage as defined in claim 1 wherein said first position and said second position are at the same operational level.

3. A stacking assemblage as defined in claim 1 wherein said second position is laterally displaced from said first position and shifting means comprising means for laterally moving said supporting means to and above said second position.

4. A stacking assemblage as defined in claim 1 wherein the supporting means comprises a movable platen for temporarily supporting said tier in a prescribed pattern thereon.

5. A stacking assemblage as defined in claim 4 including at least one movable guide member associated with said platen.

6. A stacking assemblage as defined in claim 5 wherein said guide member is a stripper and is transversely movable relative to said platen.

7. A stacking assemblage as defined in claim 6 wherein said stripper includes upper and lower boards which straddle said platen.

8. A stacking assemblage as defined in claim 7 wherein said stripper is movable in the direction of motion of said platen.

9. A stacking assemblage as defined in claim 1 wherein said second position is laterally displaced from and below said first position; and the supporting means can be elevated above and below said first position.

10. A stacking assemblage as defined in claim 1 wherein the automatic positioning means includes a photo cell system.

11. A stacking assemblage as defined in claim 1 wherein said supporting means is moved downwardly when the eyes of both said upper pair and lower pair receive light.

12. A stacking assemblage as defined in claim 11 wherein said supporting means moves downwardly until at least one eye of said lower pair receives light.

13. A stacking assemblage as defined in claim 1 wherein said supporting means remains at its level when one or both eyes of said lower pair have light interruption and both eyes of said upper pair receive light.

14. A stacking assemblage as defined in claim 1 wherein said supporting means moves upwardly when both eyes of said upper pair and said lower pair of both eyes of said lower pair and one eye of said upper pair have light interruption until both eyes of said upper pair receive light.

15. A stacking assemblage as defined in claim 1 further including a backstop with reflectors thereon for light for said photoelectric sensors.

16. A stacking assemblage as defined in claim 15 wherein said reflectors are positioned in at least one vertical column on said backstop.

17. A stacking assemblage as defined in claim 16 wherein said reflectors are mounted in two vertical columns.

18. A stacking assemblage as defined in claim 15 wherein said backstop in adjustable.

19. A stacking assemblage as defined in claim 1 wherein each photocell pair includes a light source and an eye that responds to light.

20. A stacking assemblage as defined in claim 1 wherein said sensors are mounted to receive diagonally transmitted light.

21. A stacking assemblage as defined in claim 20 wherein said transmitted light is reflected from one of twin reflectors at each level of a reflecting backboard containing such reflectors, with one reflector at each level active when said backboard is adjusted away from said supporting means and the other is active when said backboard is adjusted towards said supporting means 22. A stacking assemblage as defined in claim 1 wherein said sensors of said lower pair are mounted at the same level.

23. A stacking assemblage as defined in claim 1 wherein said sensors of said upper pair are mounted at the same level.

24. A stacking assemblage as defined in claim 1 wherein the upper sensors are mounted in alignment above corresponding lower sensors.

25. A stacking assemblage as defined in claim 1 wherein the upper sensors are connected to the input terminals of a first NAND gate, the lower sensors are connected to the input terminals of a second NAND gate, and the output terminals of the NAND gates are connected to the input terminals of an AND gate for controlling the upward motion of said supporting means.

26. A stacking assemblage as defined in claim 1 wherein the upper sensors are connected to the input terminals of a first AND gate, the lower sensors are connected to the input terminals of a second AND gate, and the output terminals of the first and second AND gates are connected to the input terminals of a third AND gate for controlling the downward motion of said supporting means.

27. A stacking assemblage as defined in claim 25 or 26 wherein the controlling AND gates act upon a motor which drives the shaft of a screw for elevating or lowering said supporting means.

* * * * *